(No Model.)
E. DAVIDSON.
HORSE HITCHING DEVICE.
No. 356,305. Patented Jan. 18, 1887.
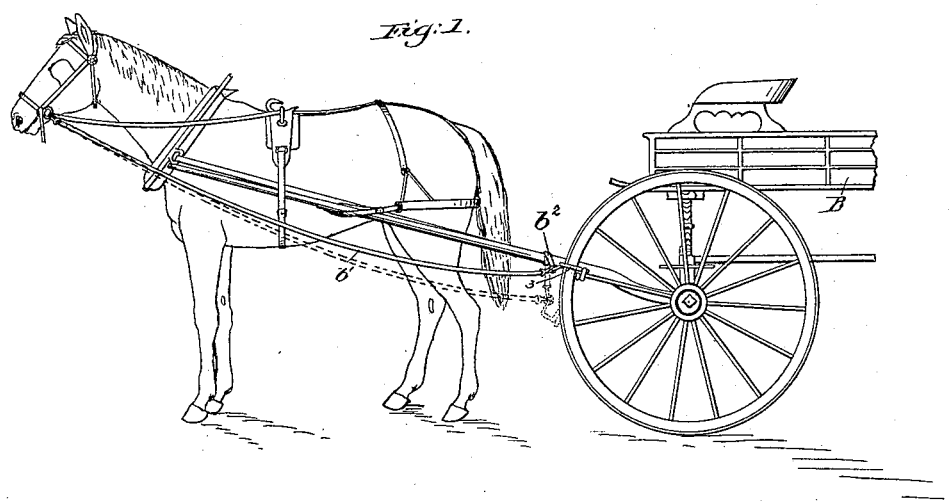
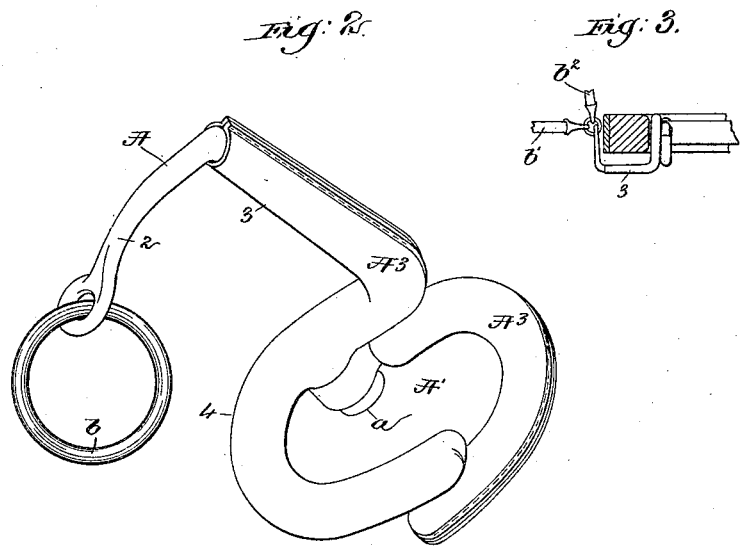
Witnesses
Fred L. Emery.
John F. C. Preinkert
Inventor.
Edward Davidson.
by Crosby & Gregory
att'ys.

United States Patent Office.

EDWARD DAVIDSON, OF WEST DEDHAM, MASSACHUSETTS.

HORSE-HITCHING DEVICE.

SPECIFICATION forming part of Letters Patent No. 356,305, dated January 18, 1887.

Application filed October 19, 1886. Serial No. 216,624. (No model.)

*To all whom it may concern:*

Be it known that I, EDWARD DAVIDSON, of West Dedham, county of Norfolk, and State of Massachusetts, have invented an Improvement in Horse-Hitching Devices, of which the following description, in connection with the accompanying drawings, is a specification, like letters on the drawings representing like parts.

This invention has for its object to provide means for securing horses when left alone upon the street.

Prior to my invention horses in harness and standing are commonly secured to a post by a hitch-rein, or they are held by means of a strap and weight, the latter resting upon the ground. In many respects the weight is objectionable, as the horse frequently steps upon the strap connecting the weight to the bridle, and in the case of a nervous and high-spirited horse the mere stepping upon the said strap frightens him and results in accidents.

In some cities the employment of posts for hitching purposes is not permitted.

In accordance with my invention the horse is held by means of a holding device adapted to be secured to one of the wheels of the wagon or carriage, and to the shafts, the said device embracing one of the spokes and a part of the felly, the holding device being also connected to the bridle by a suitable strap or chain.

My improved holding device or horse-hitch consists, essentially, of a clamp and a bent arm extended therefrom, the clamp embracing a spoke, and the arm embracing the felly and being connected by any usual strap or equivalent to both the shaft and to the bridle or head-stall.

Figure 1 shows a horse and a sufficient portion of a wagon, and a holding device embodying my invention secured to the wheel and connected to the bridle and shaft by straps; Fig. 2, an enlarged perspective view of the holding device, and Fig. 3 a section below the dotted line $x\,x$ of Fig. 1.

My improved holding device is composed of a main rod, A, of iron or steel, or other suitable metal, which, as herein shown, is bent to form three portions, 2 3 4, the portions 2 and 4 being substantially at right angles to the portion 3. The portion 4 of the main rod A, constituting one member of the clamp, has a stud, $a'$, on which is pivoted a hook, $A'$, which, co-operating with the part 4 of the rod A, forms the second member of the clamp, the two members in practice encircling a spoke of the carriage-wheel.

The hook $A'$ and the rod A for the greater part of their length are covered with a leather or other non-metallic shield, $A^3$, to prevent marring the wheels.

The part 2 of the rod A is provided at its end with an eye, through which is inserted a ring, $b$, to receive the strap $b'$, which is to connect the holder and the bridle and head-stall.

The arm of the holder is secured to the shaft by a flexible connection, preferably a strap, $b^2$; but it may be a rope or chain, and when not in engagement with the spoke hangs from the shaft, or otherwise.

When it is desired to hitch the horse, the driver places the jaws of the holding device about a spoke, as shown in Fig. 1, and connects the strap or chain $b'$ to the bridle, the part 3 of the main rod A lying across the felly, and the part 2, at right angles to it, extending across the tire, the portions 2 3 preventing the device from being moved on the spoke toward the hub of the wheel should the horse start. It will thus be seen that the strap or chain $b'$ is elevated away from the horse's feet, so that all danger of stepping upon the said strap is removed.

If, for any reason, the horse starts to move away, the strap securing the holding device to the shaft prevents rotation of the wheel, while the slightest movement of the wheel acts on the strap $b'$ and draws or pulls upon the head of the horse, thus effectually stopping him.

By applying the holding device so that it always remains at the periphery of the wheel the strap will be jerked very hard with but a slight movement of the wheel should the horse attempt to run away.

When desired to remove the holding device from the wagon-wheel, the rod $A'$, constituting a part of the clamp, will be turned so as to unclamp it from the spoke, the said holding device, when unclamped and not in use, hanging, as stated, from the shaft.

When the holding device is not in actual use as a hitch, it occupies the position shown by dotted lines, Fig. 1.

I claim—

1. A holding device or horse-hitch consisting, essentially, of a rigid or non-elastic clamp or jaw to embrace a spoke and a bent arm extended from the clamp to span the felly and tire of the wheel, substantially as described.

2. A holding device or horse-hitch consisting of a main rod, A, bent or curved, substantially as described, to form part of a clamp or jaw and leave portions 2 and 3 to embrace the felly, combined with the hook A', pivotally connected to the rod A, and forming the second half of the clamp or jaw, the said clamp when in use encircling a spoke of a wheel and being adapted to be connected to the bridle of the harness and to the shaft, all substantially as described.

3. A holding device or horse-hitch consisting, essentially, of a rigid or non-elastic clamp or jaw covered with a non-metallic shield, and adapted to embrace a spoke, and a bent arm covered with a non-metallic shield and extended from the clamp to span the felly and tire of the wheel, substantially as described.

In testimony whereof I have signed my name to this specification in the presence of two subscribing witnesses.

EDWARD DAVIDSON.

Witnesses:
G. W. GREGORY,
J. H. CHURCHILL.